United States Patent

Hosoda et al.

(12) United States Patent
(10) Patent No.: US 6,828,000 B2
(45) Date of Patent: Dec. 7, 2004

(54) OPTICAL RECORDING MEDIUM

(75) Inventors: Yasuo Hosoda, Tsurugashima (JP);
Satoshi Jinno, Tsurugashima (JP);
Ayumi Mitsumori, Tsurugashima (JP);
Hideo Kudo, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/265,271

(22) Filed: Oct. 7, 2002

(65) Prior Publication Data

US 2003/0118772 A1 Jun. 26, 2003

(30) Foreign Application Priority Data

Oct. 9, 2001 (JP) ........................................ 2001-311937

(51) Int. Cl.[7] .............................................. B32B 3/02
(52) U.S. Cl. ..................... 428/64.1; 428/64.4; 428/64.5; 428/64.6; 430/270.13
(58) Field of Search .............................. 428/64.1, 64.4, 428/64.5, 64.6, 913; 430/270.13, 495.1, 945

(56) References Cited

U.S. PATENT DOCUMENTS 5,753,334 A    5/1998   Yoshioka et al. .......... 428/64.4
6,071,588 A  * 6/2000   Nobumasa et al. ........ 428/64.4

FOREIGN PATENT DOCUMENTS

EP    1 067 533    1/2001
WO    WO 98/47141  10/1998
WO    WO 00/63899  10/2000

OTHER PUBLICATIONS

European Search Report dated Aug. 7, 2003.
Patent Abstracts of Japan No. 10-275360, dated Oct. 13, 1998.
Patent Abstracts of Japan No. 10-326434, dated Dec. 8, 1998.
Patent Abstracts of Japan No. 11-115315, dated Apr. 27, 1999.

* cited by examiner

Primary Examiner—Elizabeth Mulvaney
(74) Attorney, Agent, or Firm—Armstrong, Kratz, Quintos, Hanson & Brooks, LLP

(57) ABSTRACT

A film constitution in an optical recording medium including a light incident side substrate and a light reflecting side substrate cooperatively acting as a base of the medium, and includes, between these substrates, those layers formed by sputtering so as to constitute a laminated structure, which layers include: a phase-change recording layer to be phase-changed between an amorphous phase and a crystal phase by laser light irradiation; a first dielectric layer and a second dielectric layer, each having a protective function and an optical adjusting function for the phase-change recording layer; a reflecting film layer for reflecting the laser light transmitted through the phase-change recording layer; a hardness enhancing layer for enhancing the mechanical strength of the medium; and a protecting layer having a function for reducing thermal damages to the light incident side substrate and an optical adjusting function.

4 Claims, 2 Drawing Sheets

PRIOR ART

OPTICAL RECORDING MEDIUM

BACKGROUND OF THE INVENTION

1. Field of the Invention

The present invention relates to an optical recording medium utilizing a phase change by laser light irradiation, and more particularly to an optical recording medium adapted to higher recording densities.

2. Description of Related Art

Many devices are currently used as recording media for recording pieces of information. Among them, phase change type recording media are known, such as main recording media, which support the practical use of DVD's (Digital Versatile Discs) which are recording media of voice, image and information.

Such a phase change type recording medium is formed with a recording layer including chalcogens as main components, in which the recording layer is locally irradiated by laser light so as to cause a phase change between a crystal phase and a noncrystal phase, to thereby conduct recording by utilizing the difference between optical characteristics in the respective phase states.

Figure 4:
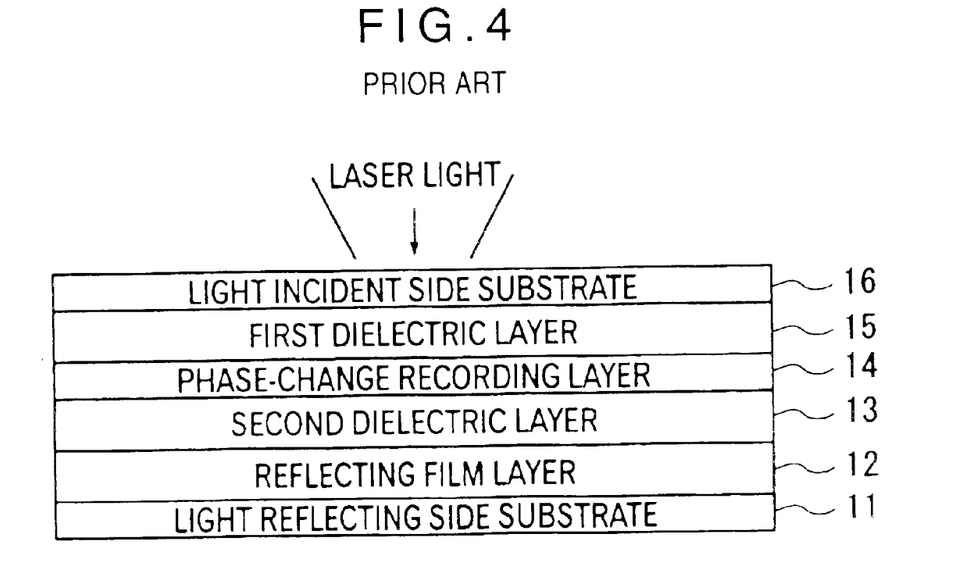
FIG. 4 is a view of a layered structure of a conventional optical recording medium.

FIG. 4 shows a film constitution of a conventional phase change type-recording medium. In FIG. 4, the phase change type recording medium comprises a light reflecting side substrate 11 sequentially laminated thereon with: a reflecting film layer 12, a second dielectric layer 13, a phase-change recording layer 14 and a first dielectric layer 15, all of which layers are formed by a film-forming method such as a resistive heating vacuum deposition method, an electron beam vacuum deposition method, or a sputtering method; and a light incident side substrate 16 provided thereon by adhesion or by coating and curing.

The light reflecting side substrate 11 and light incident side substrate 16 are generally transparent in the visible light range, and it is possible to adopt therefor those made of: glass; a plastic resin such as polycarbonate; or an ultraviolet curable resin. Typically, the light reflecting side substrate 11 is provided thereon with a tracking-aimed guide groove serving as a rail for precisely guiding the travel of the light beam.

The reflecting film layer 12 reflects the laser light transmitted through the phase-change recording layer 14 so as to cause the thus reflected laser light to interfere with the laser light reflected by an upper surface of the phase-change recording layer 14, and adopted for the reflecting film layer 12 is a single metal material having a higher reflectivity such as Al, Au, Ag, Cu, Cr, an alloy including a plurality of kinds of such metals, and a mixture thereof.

The phase-change recording layer 14 is a material having a reflectivity to be changed by a phase change reversibly caused by laser light irradiation, and there is concretely adopted therefor an alloy mainly including Te such as Sb—Te, Ge—Sb—Te, Ag—In—Sb—Te, and Ge—In—Sb—Te. Optical recording media including phase-change recording layers made of such Te alloys have a higher crystallization speed and thus a shorter erasure time, thereby enabling a high-speed overwrite based on a single circular beam by simply modulating an irradiation power of laser light. The state of the phase-change recording layer just after film formation is an amorphous or noncrystal phase state. Thus, there is conducted an initialization treatment for bringing the whole of phase-change recording layer into a crystal phase, so as to form a recorded portion upon recording a piece of information into the phase-change recording layer. The recording is achieved by forming an amorphous phase portion within a crystallized state.

The first dielectric layer 15 and second dielectric layer 13 are arranged on both sides of the phase-change recording layer 14, respectively, so as to have: a protective function for avoiding a change of optical characteristics of the phase-change recording layer 14 due to a chemical change thereof such as oxidation; and an optical adjusting function for adjusting the reflectivities of recorded portion and erased portions in the phase-change recording layer 14 by film thicknesses, refractive indexes and optical absorptivities of these dielectric layers, respectively. Adopted as these dielectric layers are those materials having an excellent adhesive property to the phase-change recording layer 14 and reflecting film layer 12, and durability causing no cracks even due to long-term storage. Particularly, there have been conventionally adopted mixtures of ZnS and $SiO_2$, since they have smaller film stresses and excellent adhesive properties to adjoining layers.

In the aforementioned conventional phase change type recording medium having the film constitution shown in FIG. 4, rewriting for a great number of times result in diffusion of constituent atoms of the first dielectric layer 15 and second dielectric layer 13 into the phase-change recording layer 14 to thereby change the composition of the phase-change recording layer 14, thereby causing a possibility of an occurrence of fluctuation such as of recording characteristic and erasure characteristic due to repetitively conducted rewriting.

To avoid such a deterioration of characteristics due to repetitive rewriting, there has been proposed a phase change type-recording medium having anti-diffusion layers (see JP-A-10-275360 [275360/1998], and JP-A-11-115315 [115315/1999], for example).

The phase change type recording medium having such anti-diffusion layers includes the anti-diffusion layers made of silicon oxide, aluminum nitride, germanium nitride, between the phase-change recording layer 14 and first dielectric layer 15 and between the phase-change recording layer 14 and second dielectric layer 13, respectively, in a manner to interpose the phase-change recording layer 14 therebetween, to thereby avoid: mutual diffusion of constituent atoms of the first dielectric layer 15 and second dielectric layer 13 and the phase-change recording layer 14; and a timewise change of the recording layer composition.

Meanwhile, JP-A-10-326434 (326434/1998) discloses a thick-film based phase change type recording medium provided with a high hardness layer having a sufficiently large film thickness and a hardness higher than that of the first dielectric layer 15, in a manner to be contacted with the laser light incident side of the first dielectric layer 15, so as to increase the mechanical strength of the medium and to reduce the deterioration at a write starting portion and a write ending portion of each of sectors in repetitive rewriting.

Recently, requirements for higher recording densities in optical recording media have become increasingly severe, and beam diameters of laser light are also promoted to be diminished for higher recording densities. One way to achieve the above includes shortened wavelengths of laser light.

Namely, in focusing a laser beam by an optical lens, the minimum beam diameter depends on the wavelength of the laser, so that the shorter wavelength allows further diminishing of the beam diameter. This means that recording densities of optical recording media can be increased inversely proportionally to the laser wavelength, so that there is a trend to replace light sources from currently used laser beams in the red color range to those in the violet range having wavelengths near 400 nm.

Meantime, in the aforementioned conventional phase change type recording medium, the laser light having a high energy density is locally irradiated onto the recording layer upon recording, thereby causing considerable mechanical strains in the recording layer. As such, repetitive rewriting for a great number of times result in repeated melting and solidification of the recording layer thereby easily causing a flow of the melted recording layer, to thereby cause problems such as deterioration of jitter characteristics, decreasing of amplitudes of reproduced signals, and a due number of rewriting operations is not sufficiently ensured.

Particularly, in case of adopting mark edge recording, the recording layer tends to flow due to recording and erasing more easily than pit position recording, thereby leading to more considerable strains at edge portions of record marks.

The cause of the above can be considered to be the facts: that those elements or compounds constituting the recording layer are segregated into shapes of record marks resulting from overheating by irradiation of laser light having a high energy density; and that the recording layer is brought to high temperatures exceeding the melting point of the recording layer, resulting in that the first dielectric layer and second dielectric layer contacting with the recording layer are thermally expanded to thereby deteriorate the mechanical strength of the medium such that these dielectric layers are bent toward the recording layer, thereby pushing out the melted recording layer to those locations at lower temperatures and in the recording track direction, thereby leading to an decreased amount of the recording layer material in the recording region.

Further, such a film thickness change of the recording layer and the physical deformation of the first dielectric layer, second dielectric layer and substrates resulting from thermal expansion problematically deteriorate the stability of tracking.

Meanwhile, in the aforementioned phase change type recording medium having the anti-diffusion layers, the thermal conductivity of the anti-diffusion layers such as silicon oxide, aluminum nitride or germanium nitride is larger than that of the first dielectric layer and second dielectric layer of the medium. This causes a problem such that the heat conduction characteristic is largely changed from the recording layer to the adjoining layers, i.e., that the heat at the recording layer due to the laser light irradiation tends to escape through the anti-diffusion layers to thereby excessively rapidly lower the temperature of the recording layer heated by the laser light irradiation, such that record marks are not correctly formed within the recording region upon recording, thereby deteriorating the jitter characteristics.

Moreover, in case of forming high hardness layers having higher hardness and larger thickness upon manufacturing optical recording media, the film forming speed is typically low, so that films having larger thicknesses problematically require a longer period of time for film formation, to thereby deteriorate the productivity.

SUMMARY OF THE INVENTION

It is therefore a main object of the present invention to provide an optical recording medium which sufficiently maintains a mechanical strength of the medium when adapted to higher recording densities, to thereby avoid mechanical strains of the recording layer due to heat even in case of conducting repetitive recording, and which medium particularly has a superior stability of record marks and an excellent resistance to repetitive recording in mark edge recording.

To achieve the object, the present invention provides an optical recording medium including a recording layer and a substrate, in which light is irradiated to the recording layer to conduct a phase change of the recording layer between an amorphous phase and a crystal phase to thereby record/erase information into/from the recording layer thereby enabling to rewrite the information through the change of optical characteristics by the phase change, wherein the optical recording medium further comprises at least a hardness enhancing layer and a first dielectric layer, such that the hardness enhancing layer, the first dielectric layer and the recording layer are laminated on the substrate in this order; wherein the hardness enhancing layer has a hardness higher than that of the first dielectric layer; and wherein the hardness enhancing layer has a film thickness Th having a value settled correspondingly to a film thickness T1 of the first dielectric layer, such that the film thickness Th and the film thickness T1 have a relationship of 0.4<Th/T1 and the film thickness Th is less than 15 nm.

Figure 1:
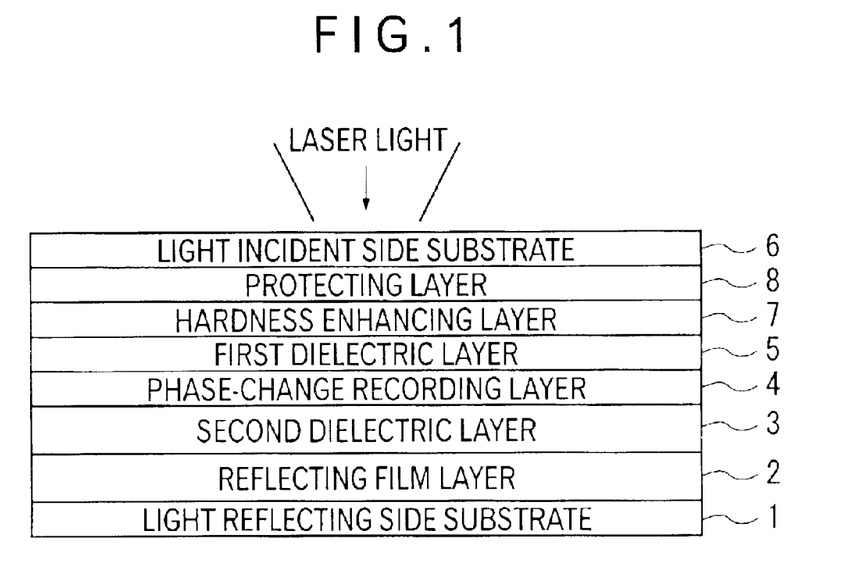
FIG. 1 is a view of a layered structure of an optical recording medium in the present invention.

In this way, according to the present invention, it becomes possible to sufficiently reinforce the entire medium to thereby realize enhancement of the mechanical strength of the medium, by providing the hardness enhancing layer 7 having a hardness greater than that of the first dielectric layer 5 and by appropriately selecting the substance constituting the hardness enhancing layer 7, as shown in FIG. 1. Particularly, even when laser beams having higher energies at shorter wavelengths correspondingly to higher recording densities are irradiated to thereby bring the phase-change recording layer 4 to high temperatures, the otherwise considerable mechanical strains of the phase-change recording layer 4 resulting from heat are avoided by virtue of the hardness enhancing layer 7, thereby allowing to avoid the flow of the phase-change recording layer 4 and the deformation of the whole of the phase-change recording layer 4 to be otherwise caused thereafter.

Particularly, it becomes possible to stabilize record marks in mark edge recording to thereby obtain reproduced signals faithful to recorded signals, and to ensure a due number of rewriting times.

Further, the hardness enhancing layer 7 is laminated without contacting the phase-change recording layer 4, so that the heat conduction characteristic of the phase-change recording layer 4 is not changed, i.e., the thermal conductivity of the layer adjoining to the phase-change recording layer 4 is not changed, thereby allowing to obtain a stable recording sensitivity.

Meantime, if the film thickness Th of the hardness enhancing layer 7 and the film thickness T1 of the first dielectric layer 5 have a relationship of Th/T1≦0.4 therebetween, the film thickness Th of the hardness enhancing layer 7 becomes small relative to the film thickness T1 of the first dielectric layer 5, to thereby restrict the effects of the hardness enhancing layer 7 for enhancing the mechanical strength of the medium and for avoiding the mechanical strains of the phase-change recording layer 4 resulting from heat. As such, when the phase-change recording layer 4 is brought to high temperatures by irradiation of laser light having a high energy density upon recording, the phase-change recording layer 4 is caused to flow, to thereby cause a deformation of the whole of phase-change recording layer 4, thereby deteriorating the stability of record marks and the stability of tracking.

It is thus desirable that the film thickness Th of the hardness enhancing layer 7 and the film thickness T1 of the first dielectric layer 5 has the relationship of 0.4<Th/T1, such that the film thicknesses of the hardness enhancing layer 7 and first dielectric layer 5 may be thinly formed insofar as satisfying the film thickness ratio. This allows the mechanical strains otherwise caused within the hardness enhancing layer while maintaining the mechanical strength of the medium and avoiding mechanical strains of the phase-change recording layer 4 resulting from heat, to thereby avoid an occurrence of separation and fine cracks at interfaces between adjoining layers so that the resistance to repetitive recording is improved.

Moreover, the hardness enhancing layer 7 and first dielectric layer 5 can be deposited in thinner film thicknesses, to shorten the film-forming time upon manufacturing, thereby improving the productivity.

When the film thickness Th of the hardness enhancing layer 7 is less than 15 nm, jitter characteristics become excellent.

In the present invention, it is desirable that the film thickness of the hardness enhancing layer is in a range of 1 nm to 10 nm.

In this way, according to the present invention, even when the film thickness of the hardness enhancing layer 7 is on the order of 1 nm to 10 nm, the mechanical strength of the medium can be sufficiently maintained to thereby avoid mechanical strains of the phase-change recording layer 4 resulting from heat. Nonetheless, defining the film thickness of the hardness enhancing layer 7 in the aforementioned manner allows the film thickness of the first dielectric layer 5 to be freely set insofar as satisfying the conditions of 0.4<Th/T1 such that the first dielectric layer 5 is allowed to have a required dimension, to thereby optimize the optical recording medium such as correspondingly to usage and required performances upon designing the optical recording medium.

Further, thinly forming the film having the higher hardness avoids an occurrence of larger stresses within the film, to thereby avoid an occurrence of separation and fine cracks at interfaces between adjoining layers. Jitter characteristics are particularly excellent, within such a range where the film thickness of the hardness enhancing layer 7 is small.

In the present invention, it is desirable that the film thickness of the first dielectric layer is in a range of 1 nm to 5 nm.

In this way, according to the present invention, even when the film thickness of the first dielectric layer 5 is on the order of 1 nm to 5 nm, the protective function and optical adjusting function of the first dielectric layer 5 for the phase-change recording layer 4 is ensured so that the recording/reproducing characteristics are never deteriorated. Further, thinly forming the film thickness of first dielectric layer 5 allows to promote that effect to be achieved by the hardness enhancing layer 7, which effect restricts the otherwise thermally caused flow of the phase-change recording layer 4 accompanying to the higher temperature of the phase-change recording layer 4 due to irradiation of laser light having a high energy density.

Moreover, the film thicknesses of the layers are formed to be sufficiently thin upon manufacturing the optical recording medium, so that the film-forming time is shortened, thereby leading to an improved productivity.

In the present invention, it is desirable that the hardness enhancing layer has a Vickers hardness of 4,000 N/mm$^2$ or higher, or the hardness enhancing layer has a Knoop hardness of 4,000 N/mm$^2$ or higher.

In this way, according to the present invention, the mechanical strength of the medium can be enhanced even when the hardness enhancing layer 7 is thin if the Vickers hardness of the hardness enhancing layer 7 is 4,000 N/mm$^2$ or higher from the viewpoint of the mechanical strength of the medium and the viewpoint of the Vickers hardness of the first dielectric layer 5, thereby allowing to restrict the flow of phase-change recording layer 4 and to ensure a due number of rewriting times. The material of such a hardness enhancing layer 7 includes a metallic compound such as a metal nitride, metal oxide, metal carbide, metal sulfide, metal selenide, and a mixture thereof.

DETAILED DESCRIPTION OF PREFERRED EMBODIMENT(S)

There will be described hereinafter the embodiments according the present invention, with reference to the accompanying drawings.

[First Embodiment]

Figure 2:
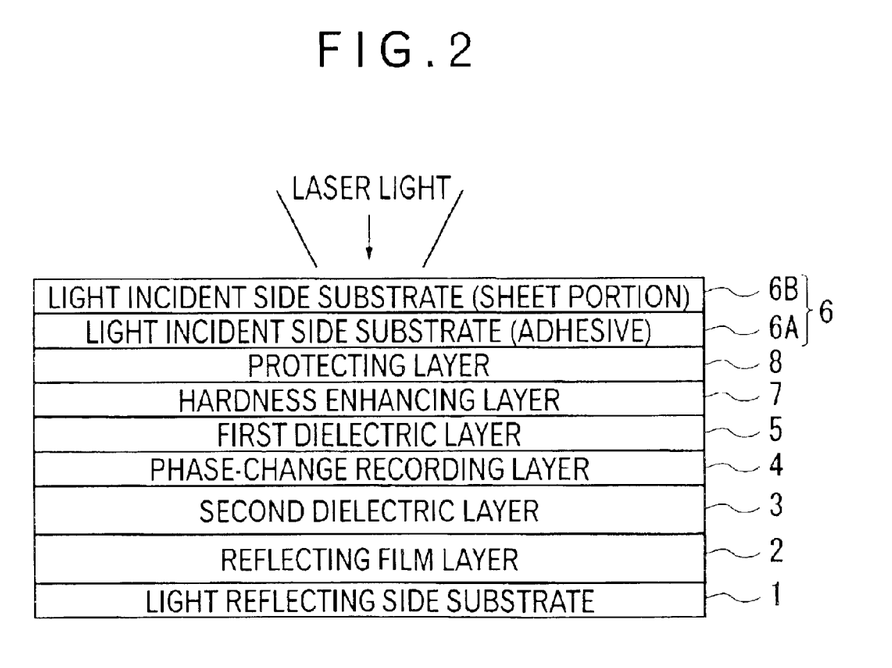
FIG. 2 is a view of a layered structure of an optical recording medium in a first embodiment of the present invention.

As shown in FIG. 2, the film constitution in the optical recording medium of the present invention includes a light incident side substrate 6 and a light reflecting side substrate 1 cooperatively acting as a base of the medium, and includes, between these substrates, those layers formed by sputtering so as to constitute a laminated structure, which layers include: a phase-change recording layer 4 to be phase-changed between an amorphous phase and a crystal phase by laser light irradiation; a first dielectric layer 5 and a second dielectric layer 3, each having a protective function and an optical adjusting function for the phase-change recording layer 4; a reflecting film layer 2 for reflecting the laser light transmitted through the phase-change recording layer 4; a hardness enhancing layer 7 for enhancing the mechanical strength of the medium; and a protecting layer 8, as required, having a function for compensating for a change of optical characteristics due to the addition of the hardness enhancing layer 7.

Adopted as the light reflecting side substrate 1 is a homogeneous material, which is generally transparent in the visible light range, and has water-absorptivity and hygroscopicity. Typically, this light reflecting side substrate 1 is prepared by injection molding by adopting a mold called a stamper formed with a tracking-aimed groove at a precision of sub-micron by laser cutting. Here, it is possible to adopt those materials having the aforementioned characteristics. For example, it is possible to adopt a substrate made of glass and a plastic resin such as polycarbonate. Sequentially laminated onto this substrate are the following layers, by sputtering.

The reflecting film layer 2 enhances a signal contrast, by having a higher reflectivity to thereby increase the amount of reflected light. The reflecting film layer 2 also serves as a heat dissipating layer, and is desirably made of a material having a higher thermal conductivity. Particularly, as a material having heat stability against laser light irradiation, it is possible to adopt a single metal material such as Al, Au, Ag, Cu, Cr, an alloy including a plurality of kinds of such metals, and a mixture thereof.

The first dielectric layer 5 and second dielectric layer 3 are formed to contact with and interpose the phase-change recording layer 4 therebetween so as to avoid a change of optical characteristics of the phase-change recording layer 4 resulting from a chemical change thereof such as oxidation, and these dielectric layers are required to be a material having adherence to the phase-change recording layer 4 and having a higher stability against the heat due to melting of the phase-change recording layer 4 upon recording. For example, it is possible to adopt metallic compounds such as: a thin film of ZnS; a metal oxide such as $SiO_2$; a metal nitride; a metal sulfide; a metal selenide; and mixtures thereof. Here, the film thickness of the first dielectric layer 5 is preferably in a range of 1 nm to 5 nm based on an experimental result (Table 3) to be described later, so as to sufficiently obtain an effect for enhancing the mechanical strength by the hardness enhancing layer 7.

The phase-change recording layer 4 is phase-changed between an amorphous phase and a crystal phase by laser light irradiation, thereby allowing to read out information from the phase-change recording layer 4, because the crystal phase has a complex refractive index different from that of the amorphous phase so that the reflectivity or phase of the medium becomes different. The phase-change recording layer 4 in the present invention may include Sb—Te, Ge—Sb—Te, Ag—In—Sb—Te, and Ge—In—Sb—Te, but is not limited thereto. Among them, those including Ge, In, Sb, Te as main components have higher crystallization speeds, shorter erasure time, and superior recording characteristics for a great number of times.

The hardness enhancing layer 7 has a hardness greater than that of the first dielectric layer 5, so as to enhance the mechanical strength of the medium, to thereby avoid: otherwise thermally caused flow of the recording layer accompanying to the higher temperature caused by irradiation of high energy beam such as laser light upon recording; and the deformation of the whole of recording layer to be otherwise caused thereafter. Here, the Vickers hardness or Knoop hardness of the hardness enhancing layer 7 is preferably 4,000 $N/mm^2$ or higher which is the Vickers hardness or Knoop hardness of $ZnS$—$SiO_2$ to be particularly frequently used as the first dielectric layer 5, and it is possible to adopt metallic compounds such as metal nitrides, metal oxides, metal sulfides, metal selenides shown in Table 1, and mixtures thereof. Further, insofar as the mechanical strength of the medium is maintained, the hardness enhancing layer 7 is formed to have a film thickness preferably within a range of 1 nm to 10 nm, because separation and fine cracks are not caused at interfaces between adjoining layers based on the experimental result (Table 3) to be described later, even after repetitive rewriting for a great number of times. It is further preferable that the film thickness Th of the hardness enhancing layer 7 and the film thickness T1 of the first dielectric layer 5 have a relationship of 0.4<Th/T1.

TABLE 1

| a | | b | |
|---|---|---|---|
| | Knoop Hardness $N/mm^2$ | | Vickers Hardness $N/mm^2$ |
| AlN | 14700 | TiN | 19600 |
| $Si_3N_4$ | 19600 | TiAlN | 39200 |
| $Al_2O_3$ | 19600 | TiC | 29400 |
| $ZrO_2$ | 14700 | TiCN | 29400 |
| $SiO_2$ | 5880 | CrN | 14700 |
| $Ta_2O_5$ | 5880 | SiC | 34300 |
| $BK_3$ | 5880 | $Si_3N_4$ | 19600 |
| | | $Al_2O_3$ | 19600 |
| | | $ZrO_2$ | 14700 |
| | | AlN | 9800 |

The protecting layer 8 compensates for a change of optical characteristics resulting from the addition of the hardness enhancing layer 7, as required, and to simultaneously protect the phase-change recording layer 4 from mechanical damages from the exterior while reducing thermal damages to the light incident side substrate 6, as a secondary effect. Adopted as the protecting layer 8 is a material having a higher adherence to the light incident side substrate 6. Such a material is not particularly limited, and may be the same as the first dielectric layer 5 or second dielectric layer 3.

As the light incident side substrate 6, it is possible to adopt a homogeneous material having water-absorptivity and hygroscopicity, similarly to the light reflecting side substrate 1. Herein, adopted as such a material is a sheet 6B made of glass or a plastic resin such as polycarbonate, and adhered onto an upper surface of the protecting layer 8 by an adhesive 6A.

According to the aforementioned first embodiment, there can be obtained the following effects.

(1) By providing the hardness enhancing layer 7 having a greater hardness than the first dielectric layer 5 and by appropriately selecting the substance constituting the hardness enhancing layer 7, it becomes possible to sufficiently reinforce the entire optical recording medium to thereby enhance the mechanical strength of the optical recording medium, even by the hardness enhancing layer 7 having a smaller film thickness. Particularly, even when beams having higher energies at shorter wavelengths correspondingly to higher recording densities are irradiated to thereby bring the phase-change recording layer 4 to high temperatures, the otherwise considerable mechanical strains of the phase-change recording layer 4 due to heat are avoided by virtue of the hardness enhancing layer 7, thereby allowing to avoid the flow of the phase-change recording layer 4 and the deformation of the whole of the phase-change recording layer 4 to be otherwise caused thereafter, to thereby improve the resistance to repetitive recording.

(2) Introducing the hardness enhancing layer 7 enables enhancement of the mechanical strength of the medium, thereby avoiding: a film thickness change of the phase-change recording layer 4 resulting from irradiation of laser light having a high energy density; and physical deformations of the first dielectric layer 5 and second dielectric layer 3, resulting from, for example, thermal expansion. This stabilizes the tracking, thereby avoiding: an occurrence of cross erase wherein information of recorded portions in an amorphous phase in the adjoining tracks is erased, upon recording/erasing; and an occurrence of cross-talk wherein leakage of reproduced signals from adjoining tracks is caused upon reproducing.

(3) The hardness enhancing layer 7 is laminated via first dielectric layer 5, without contacting with the phase-change recording layer 4, so that the heat conduction characteristic of the phase-change recording layer 4 is never changed by the hardness enhancing layer 7, i.e., the heat by laser light irradiation is permitted to appropriately diffuse within the phase-change recording layer 4, thereby allowing a stable recording sensitivity.

(4) Even by the film thickness of the hardness enhancing layer 7 on the order of 1 nm to 10 nm, the mechanical strength of the optical recording medium can be sufficiently maintained to thereby avoid mechanical strains of the phase-change recording layer 4 resulting from heat. Further, the hardness enhancing layer 7 is formed into a region having a smaller film thickness to permit to reduce stresses to be otherwise caused within the film of the hardness enhancing layer 7, thereby avoiding an occurrence of separation and fine cracks at interfaces between adjoining layers so that the resistance to repetitive recording is improved.

(5) Even when the film thickness of the first dielectric layer 5 is on the order of 1 nm to 5 nm, the protective function and optical adjusting function of the first dielectric layer 5 for the phase-change recording layer 4 is ensured so that the recording/reproducing characteristics are never deteriorated. Further, forming the first dielectric layer 5 in such a thin or narrow range promotes that effect to be achieved by the hardness enhancing layer 7, which effect restricts the otherwise thermally caused flow of the phase-change recording layer 4 accompanying the higher temperature of the phase-change recording layer 4 resulting from irradiation of laser light having a high energy density.

(6) The film thicknesses of the hardness enhancing layer 7 and first dielectric layer 5 are formed to be sufficiently thin within the range of 0.4<Th/T1 concerning the film thickness T1 of the hardness enhancing layer 7 and the film thickness Th of the first dielectric layer 5, so that the film-forming time is shortened upon manufacturing the optical recording medium, thereby leading to an improved productivity.

(7) Insofar as the hardness of the hardness enhancing layer 7 is greater than that of the first dielectric layer 5 and the Vickers hardness or Knoop hardness of the hardness enhancing layer 7 is 4,000 N/mm$^2$ or higher, it becomes possible to restrict the thermally caused flow of the phase-change recording layer 4 resulting from laser light irradiation and to improve the resistance to repetitive recording, even by the decreased film thickness of the hardness enhancing layer 7. As such a material, it is possible to use various materials listed in Table 1, thereby enabling to optimize the design of optical recording media.

[Second Embodiment]

In the following description, like reference numerals used in the first embodiment are used to denote identical structures and identical members, and detailed descriptions thereof shall be omitted or simplified.

The optical recording medium of the first embodiment includes the light reflecting side substrate 1, and the reflecting film layer 2, second dielectric layer 3, phase-change recording layer 4, first dielectric layer 5, hardness enhancing layer 7, protecting layer 8 sequentially laminated on the light reflecting side substrate 1 by sputtering, and the light incident side substrate 6 is further formed on the protecting layer.

Figure 3:
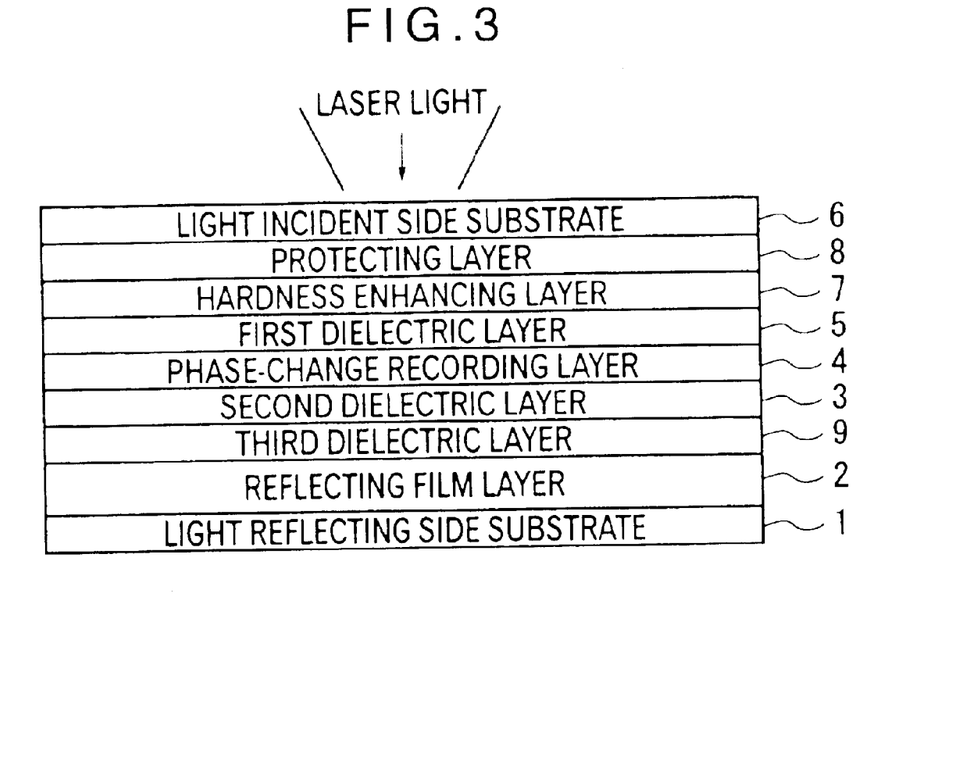
FIG. 3 is a view of a layered structure of an optical recording medium in a second embodiment of the present invention.

The optical recording medium of this second embodiment is different from the first embodiment, in that this optical recording medium includes a third dielectric layer 9 interposed between the reflecting film layer 2 and second dielectric layer 3.

The third dielectric layer 9 is provided by laminating a layer having a thermal conductivity different from that of the second dielectric layer 3, to thereby improve the cooling characteristics against the heat applied to the phase-change recording layer 4, thereby avoid an occurrence of cross erase wherein the heat is diffused up to adjoining tracks upon recording/erasing to thereby erase information in recorded portions in an amorphous phase. As materials for the third dielectric layer, it is possible to adopt metallic compounds such as metal oxides, metal nitrides, metal carbides, metal sulfides, metal selenides, and mixtures thereof, in a constitution different from the second dielectric layer 3.

According to the second embodiment, there can be obtained the following effects, in addition to those effects identical with the effects (1) through (7).

(8) Introducing the third dielectric layer 9 having a function for adjusting the cooling characteristics of the phase-change recording layer 4 and having different thermal conductivity enables avoidance of an occurrence of cross erase wherein information of recorded portions in an amorphous phase in the adjoining tracks is erased, upon recording/erasing.

(9) In such a case that the constituting substances of the reflecting film layer 2 and second dielectric layer 3 are materials susceptible of diffusion into each other, there can be obtained an effect as a barrier layer by virtue of the third dielectric layer 9, thereby improving the storage stability of the recording medium.

(10) When the constitution of the third dielectric layer 9 is the same as the hardness enhancing layer 7, these layers are brought into a state interposing the phase-change recording layer 4 therebetween, thereby further restricting the otherwise thermally caused flow of the phase-change recording layer 4 due to irradiation of laser light having a high energy density, and to avoid the deformation of the whole of recording layer to be otherwise caused thereafter.

There will be described hereinafter effects of the present invention, with reference to concrete embodiments.

EXAMPLE 1

In this Example 1, there was constituted an optical recording medium in the following manner based on the first embodiment, so as to evaluate a jitter characteristic by rewriting for a great number of times.

Namely, as shown in Table 2a, there was formed the reflecting film layer 2 having a film thickness of 100 nm by depositing an Ag—Pd—Cu alloy by sputtering, on the light reflecting side substrate 1 made of a polycarbonate resin having a thickness of 1.1 mm, a diameter of 12 cm, and a spiral groove at a pitch of 0.315 mm. Then, there was deposited ZnS—SiO$_2$ to thereby form the second dielectric layer 3 having a film thickness of 6 nm. Next, there was deposited a quaternary alloy of Ge—In—Sb—Te, to thereby obtain the phase-change recording layer 4 having a film thickness of 16 nm. Further, there was deposited ZnS—SiO$_2$ identically with the second dielectric layer 3, to thereby form the first dielectric layer 5 having a film thickness of 5 nm. In addition, there was deposited AlN to thereby form the hardness enhancing layer 7 having a film thickness of 5 mn, followed by deposition of ZnS—SiO$_2$ identically with the first dielectric layer 5 and second dielectric layer 3 to thereby form the protecting layer 8 having a film thickness of 25 nm. Adhered thereonto was the polycarbonate resin sheet 6B having a film thickness of 0.09 mm by using the adhesive 6A, so as to form the light incident side substrate 6 having a total thickness of 0.1 mm, to thereby obtain the optical recording medium of the present invention.

EXAMPLE 2

In this Example 2, the depositing conditions in the Example 1 were changed as follows, so as to evaluate a jitter characteristic by rewriting for a great number of times.

Film thickness of first dielectric layer: 5 nm

Film thickness of hardness enhancing layer: 10 nm; and

Film thickness of protecting layer: 20 nm.

EXAMPLE 3

In this Example 3, there was constituted an optical recording medium in the following manner based on the second embodiment, so as to evaluate a jitter characteristic by rewriting for a great number of times.

Namely, as shown in Table 2a, there was formed the reflecting film layer 2 having a film thickness of 200 nm by depositing an Ag—Pd—Cu alloy by sputtering, on the light reflecting side substrate 1 made of a polycarbonate resin having a thickness of 1.1 mm, a diameter of 12 cm, and a spiral groove at a pitch of 0.600 mm (i.e., having a land width of 0.300 mm and a groove width of 0.300 mm). Thereafter, there was deposited AlN to thereby form the third dielectric layer 9 having a film thickness of 5 nm. Then, there was deposited ZnS—$SiO_2$ to thereby form the second dielectric layer 3 having a film thickness of 5 nm. Next, there was deposited a quaternary alloy of Ge—In—Sb—Te, to thereby obtain the phase-change recording layer 4 having a film thickness of 10 nm. Further, there was deposited ZnS—$SiO_2$ identically with the second dielectric layer 3, to thereby form the first dielectric layer 5 having a film thickness of 2 nm. In addition, there was deposited AlN identically with the third dielectric layer 9 to thereby form the hardness enhancing layer 7 having a film thickness of 1 nm, followed by deposition of ZnS—$SiO_2$ identically with the first dielectric layer 5 and second dielectric layer 3 to thereby form the protecting layer 8 having a film thickness of 121 nm. Adhered thereonto and then cured was an ultraviolet curable resin by spin coating, so as to form the light incident side substrate 6 having a thickness of 0.1 mm, to thereby obtain the optical recording medium of the present invention.

EXAMPLE 4

In this Example 4, the depositing conditions in the Example 3 were changed as follows to thereby constitute the optical recording medium, so as to evaluate a jitter characteristic by rewriting for a great number of times.

Film thickness of first dielectric layer: 1 nm

Film thickness of hardness enhancing layer: 1 nm; and

Film thickness of protecting layer: 122 nm.

EXAMPLE 5

In this Example 5, the depositing conditions in the Example 3 were changed as follows to thereby constitute the optical recording medium, so as to evaluate a jitter characteristic by rewriting for a great number of times.

Film thickness of first dielectric layer: 2 nm

Film thickness of hardness enhancing layer: 2 nm; and

Film thickness of protecting layer: 120 nm.

EXAMPLE 6

In this Example 6, the depositing conditions in the Example 3 were changed as follows to thereby constitute the optical recording medium, so as to evaluate a jitter characteristic by rewriting for a large number of times.

Film thickness of first dielectric layer: 3 nm

Film thickness of hardness enhancing layer: 2 nm; and

Film thickness of protecting layer: 119 nm.

Comparative Example 1

In this Comparative Example 1, the depositing conditions in the Example 1 were changed as follows, so as to evaluate a jitter characteristic by rewriting for a large number of times.

Film thickness of first dielectric layer: 35 nm

Film thickness of hardness enhancing layer: not deposited; and

Film thickness of protecting layer: not deposited.

Comparative Example 2

In this Comparative Example 2, the depositing conditions in the Example 1 were changed as follows, so as to evaluate a jitter characteristic by rewriting for a large number of times.

Film thickness of first dielectric layer: 30 nm

Film thickness of hardness enhancing layer: 5 nm; and

Film thickness of protecting layer: not deposited.

Comparative Example 3

In this Comparative Example 3, the depositing conditions in the Example 1 were changed as follows, so as to evaluate a jitter characteristic by rewriting for a large number of times.

Film thickness of first dielectric layer: 25 nm

Film thickness of hardness enhancing layer: 10 nm; and

Film thickness of protecting layer: not deposited.

Comparative Example 4

In this Comparative Example 4, the depositing conditions in the Example 1 were changed as follows, so as to evaluate a jitter characteristic by rewriting for a large number of times.

Film thickness of first dielectric layer: 5 nm

Film thickness of hardness enhancing layer: 15 nm; and

Film thickness of protecting layer: 15 nm.

TABLE 2

| a | | Ex. 1 | Ex. 2 | Com. 1 | Com. 2 | Com. 3 | Com. 4 |
|---|---|---|---|---|---|---|---|
| | | Thickness | | | | | |
| Light incident side substrate | Polycarbonate resin + Adhesive | 0.1 mm | | | | | |
| Protecting layer | ZnS—$SiO_2$ | 25 nm | 20 nm | — | — | — | 15 nm |
| Hardness enhancing layer | AlN | 5 nm | 10 nm | — | 10 nm | 10 nm | 15 nm |
| First dielectric layer | ZnS—$SiO_2$ | 5 nm | 5 nm | 35 nm | 30 nm | 25 nm | 5 nm |
| Phase-change recording layer | Ge—In—Sb—Te | 16 nm | | | | | |
| Second dielectric layer | ZnS—$SiO_2$ | 6 nm | | | | | |
| Reflecting film layer | Ag—Pd—Cu | 100 nm | | | | | |
| Light reflecting side substrate | Polycarbonate resin | 1.1 nm | | | | | |

TABLE 2-continued

| | b | Ex. 3 | Ex. 4 | Ex. 5 | Ex. 6 |
|---|---|---|---|---|---|
| | | Thickness | | | |
| Light incident side substrate | Ultraviolet curable resin | 0.1 mm | | | |
| Protecting layer | ZnS—SiO$_2$ | 121 nm | 122 nm | 120 nm | 119 nm |
| Hardness enhancing layer | AlN | 1 nm | 1 nm | 2 nm | 2 nm |
| First dielectric layer | ZnS—SiO$_2$ | 2 nm | 1 nm | 2 nm | 3 nm |
| Phase-change recording layer | Ge—In—Sb—Te | 10 nm | | | |
| Second dielectric layer | ZnS—SiO$_2$ | 5 nm | | | |
| Third dielectric layer | AlN | 5 nm | | | |
| Reflecting film layer | Ag—Pd—Cu | 200 nm | | | |
| Light reflecting side substrate | Polycarbonate resin | 1.1 mm | | | |

Note:
Ex. = Example; Com. = Comparative Example

[Experimental Result]

Each of optical recording media formed with films by sputtering was previously initialized by impinging thereto a beam at a wavelength of 810 nm, to thereby bring the entire recording layer of the optical recording medium into a crystal phase.

Jitter characteristics were evaluated under the following conditions 1 in the Examples 1 and 2 and in the Comparative Examples 1 through 4, and under the conditions 2 in the Comparative Examples 3 through 6.

(Conditions 1)

There were conducted repetitive overwriting for 10,000 times of random patterns based on 1–7 modulation at a linear velocity of 5.7 m/s in a mark edge recording scheme, by using an optical head including an objective lens having a numerical aperture of 0.85 for a semiconductor laser at a wavelength of 403 nm. Here, there was used a typical ternary multi-pulse with a recording power of 4.0 mW, an erasing power of 2.2 mW, and a window width of 15.13 ns.

(Conditions 2)

There were conducted repetitive overwriting for 10,000 times of random patterns based on 1–7 modulation at a linear velocity of 5.7 n/s in a mark edge recording scheme, by using an optical head including an objective lens having a numerical aperture of 0.85 for a semiconductor laser at a wavelength of 403 nm. Here, there was used a typical ternary multi-pulse with a recording power of 4.5 mW, an erasing power of 2.5 mW, and a window width of 15.15 ns.

Results of the above are shown in Table 3.

According to the Example 1, a practically excellent result was obtained wherein the jitter was 10% or less of the window width of 15.13 ns even after repetitive overwriting for 10,000 times. It is assumed that the introduction of the hardness enhancing layer 7 enhances the mechanical strength of the optical recording medium to thereby restrict the otherwise thermally caused flow of the phase-change recording layer 4 so that record marks are stabilized. It is further assumed: that the film thickness of hardness enhancing layer 7 is a thin region of 5 nm to thereby restrict the stresses to be otherwise caused within the hardness enhancing layer 7 such that separation defects and fine cracks are no way caused even by conducting repetitive overwriting for 10,000 times; and that the first dielectric layer 5 is also a thin region of 5 nm to thereby promote the effect of the hardness enhancing layer 7 for restricting the otherwise thermally caused flow of the phase-change recording layer 4.

According to the Example 2, the jitter characteristic was substantially the same result as the Example 1, in a manner allowing to obtain a practically excellent result wherein the jitter was 10% or less of the window width of 15.13 ns even after repetitive overwriting for 10,000 times. It is assumed that even the film thickness of 10 nm of the hardness enhancing layer 7 restricts an occurrence of thermal stresses.

According to the Example 3, it was allowed to obtain a practically excellent result wherein the jitter was 10% or less of the window width of 15.15 ns even after repetitive overwriting for 10,000 times. It is assumed that the introduction of the third dielectric layer 9 having the same constitution as the hardness enhancing layer 7 allows to exhibit the same effect as the Example 1, even in a region of 1 nm for the film thickness of the hardness enhancing layer 7 which is thinner than the Example 1.

According to the Examples 4 through 6, jitter characteristics were substantially the same as the Example 3, in a manner allowing to obtain practically excellent results wherein jitters were 10% or less of the window width of 15.15 ns even after repetitive overwriting for 10,000 times.

According to the Comparative Example 1, the jitter was 12% or more of the window width of 15.13 ns after repetitive overwriting for 1,000 times, thereby leading to a practically undesirable result. It is assumed that the first dielectric layer 5 alone is incapable of avoiding: the thermally caused flow of the phase-change recording layer 4 due to irradiation of laser light at a wavelength of 403 nm having a high energy density; and the subsequent deformation of the whole of the recording layer.

According to the Comparative Examples 2 and 3, jitters started to increase to be 10% or more of the window width of 15.13 ns after repetitive overwriting for 1,000 times, and exceeded 12% of the window width of 15.13 ns after repetitive overwriting for 10,000 times, thereby leading to practically undesirable results. It is assumed that even when the hardness enhancing layers 7 was introduced, the film thickness of the first dielectric layer 5 in an increased range of 30 nm or 25 nm restricted the effects of the hardness enhancing layer 7 for enhancing the mechanical strength of the optical recording medium and for avoiding the mechanical strain of the phase-change recording layer 4 due to heat.

According to the Comparative Example 4, the jitter started to increase to be 10% or more of the window width of 15.13 ns after repetitive overwriting for 1,000 times, and exceeded 12% of the window width of 15.13 ns after repetitive overwriting for 10,000 times, thereby leading to a practically undesirable result. It is assumed that the film thickness of the hardness enhancing layer 7 was in a thick range of 15 nm though the film thickness of the first dielectric layer 5 was in a thin range of 5 nm, so that the irradiation of laser light at a wavelength of 403 nm having a high energy density caused larger thermal stresses within the hardness enhancing layer 7 to thereby cause separation defects and cracks as a result of overwriting for a great number of times.

TABLE 3

| | F.T. of layer 5 T1 (nm) | F.T. of layer 7 Th (nm) | F.T. of layer 8 (nm) | Th/T1 | Jitters after writing of N times | | |
|---|---|---|---|---|---|---|---|
| | | | | | N = 100 | N = 1,000 | N = 10,000 |
| Ex. 1 | 5 | 5 | 25 | 1.00 | ○ | ○ | ○ |
| Ex. 2 | 5 | 10 | 20 | 2.00 | ○ | ○ | ○ |
| Ex. 3 | 2 | 1 | 121 | 0.50 | ○ | ○ | ○ |
| Ex. 4 | 1 | 1 | 122 | 1.00 | ○ | ○ | ○ |
| Ex. 5 | 2 | 2 | 120 | 1.00 | ○ | ○ | ○ |
| Ex. 6 | 3 | 2 | 119 | 0.67 | ○ | ○ | ○ |
| Com. 1 | 35 | — | — | — | ○ | x | x |
| Com. 2 | 30 | 5 | — | 0.17 | ○ | Δ | x |
| Com. 3 | 25 | 10 | — | 0.40 | ○ | Δ | x |
| Com. 4 | 5 | 15 | 15 | 3.00 | ○ | Δ | x |

Note:
F.T. = film thickness; Ex. = Example; Com. = Comparative Example; layer 5 = first dielectric layer, layer 7 = hardness enhancing layer, layer 8 = protecting layer; and Evaluation of jitter: "○" = 10% or less; "Δ" = 12% or less; and "x" = 12% or more.

[Modified Embodiment]

The present invention has been described above, with reference to the preferred embodiments and Examples. However, the present invention is not limited thereto, and it is possible to conduct various alterations, modifications and design changes without departing from the spirit and scope of the present invention.

For example, without being limited to the aforementioned layered structures, the following structures are possible.

(1) A structure without a light incident side substrate or a light reflecting side substrate.

(2) A structure added with another material layer between a first dielectric layer and a light incident side substrate.

(3) A structure having two recording layers.

(4) A structure without a reflecting film layer.

(5) A structure added with one or more recording medium constitution at a position of a light incident side substrate or a light reflecting side substrate, thereby enabling to multi-layered recording.

Other various structures may be also applied.

Moreover, although the respective layers have been deposited on the light reflecting side substrate in the aforementioned embodiments, it is possible to deposit the respective layers so as to laminate them on the light incident side substrate.

What is claimed is:

1. An optical recording medium including a recording layer and a substrate, in which light is irradiated to the recording layer to conduct a phase change of said recording layer between an amorphous phase and a crystal phase to thereby record/erase information into/from the recording layer thereby enabling to rewrite the information through the change of optical characteristics by the phase change, wherein said optical recording medium comprises at least a hardness enhancing layer and a first dielectric layer, such that said hardness enhancing layer, said first dielectric layer and said recording layer are laminated on said substrate in this order, wherein said hardness enhancing layer has a hardness greater than that of said first dielectric layer, and wherein said hardness enhancing layer has a film thickness Th having a value settled correspondingly to a film thickness T1 of said first dielectric layer, such that said film thickness Th and said film thickness T1 have a relationship of 0.4<Th/T1 and said film thickness Th is in a range of 1 nm to 10 nm.

2. An optical recording medium of claim 1, wherein said film thickness T1 of said first dielectric layer is in a range of 1 nm to 5 nm.

3. An optical recording medium of claim 1, wherein said hardness enhancing layer has a Vickers hardness of 4,000 N/mm$^2$ or greater.

4. An optical recording medium of claim 1, wherein said hardness enhancing layer has a Knoop hardness of 4,000 N/mm$^2$ or greater.

* * * * *